(12) United States Patent
Matsumura et al.

(10) Patent No.: US 6,246,451 B1
(45) Date of Patent: Jun. 12, 2001

(54) STEREOSCOPIC IMAGE DISPLAYING METHOD AND STEREOSCOPIC IMAGE APPARATUS

(75) Inventors: Susumu Matsumura, Kawaguchi; Naosato Taniguchi, Urawa; Hideki Morishima, Kawasaki; Hiroyasu Nose, Tokyo, all of (JP)

(73) Assignee: Mixed Reality Systems Laboratory Inc., Kanagawa-ken (JP)

( * ) Notice: Subject to any disclaimer, the term of this patent is extended or adjusted under 35 U.S.C. 154(b) by 0 days.

(21) Appl. No.: 09/145,207

(22) Filed: Sep. 1, 1998

(30) Foreign Application Priority Data

Mar. 26, 1998 (JP) .................................................. 10-098591

(51) Int. Cl.[7] .......................... G02F 1/335; G02F 1/1343; G02B 27/22; H04N 9/47
(52) U.S. Cl. ............................ 349/15; 349/145; 359/462; 348/59
(58) Field of Search ...................... 349/15, 145; 359/464, 359/463, 462, 621, 622, 623, 624; 348/59

(56) References Cited

U.S. PATENT DOCUMENTS

| | | | | |
|---|---|---|---|---|
| 5,825,541 | * | 10/1998 | Imai ........................ | 359/464 |
| 5,831,765 | * | 11/1998 | Nakayama et al. .......... | 359/464 |
| 5,850,269 | * | 12/1998 | Kim ........................ | 349/15 |
| 5,930,037 | * | 7/1999 | Imai ........................ | 359/463 |
| 5,933,210 | * | 8/1999 | Ron ........................ | 351/246 |
| 5,943,166 | * | 8/1999 | Hoshi et al. .............. | 359/475 |
| 5,991,074 | * | 11/1999 | Nose et al. ............... | 359/465 |
| 6,061,179 | * | 5/2000 | Inoguchi et al. .......... | 359/464 |
| 6,064,528 | * | 5/2000 | Simpson, Jr. ............. | 359/619 |

FOREIGN PATENT DOCUMENTS 9-304739   11/1997   (JP) .

* cited by examiner

Primary Examiner—William L. Sikes
Assistant Examiner—Mike Qi
(74) Attorney, Agent, or Firm—Fitzpatrick, Cella, Harper & Scinto

(57) ABSTRACT

The present invention relates to a stereoscopic image displaying method and stereoscopic image displaying apparatus for interchangeably displaying a stereoscopic image and a two-dimensional image or for displaying a mixed stereoscopic image and two-dimensional image. In accordance with the present invention, light from a surface illuminant is passed through a mask substrate in which a mask pattern comprised of a plurality of apertures is formed. The light then is guided through a cylindrical lens array and a light directivity control element of polymer distributed liquid crystal having a stripe pattern, and thereafter the light irradiates a transmissive display device for displaying a stripe image having a parallax, or a two-dimensional, image. Control region stripes of the light directivity control element are brought into a non-scattering state when the stripe image is displayed on the display device. Control region stripes of the light directivity control element are brought into a scattering state when the two-dimensional image is displayed on the display device.

16 Claims, 11 Drawing Sheets

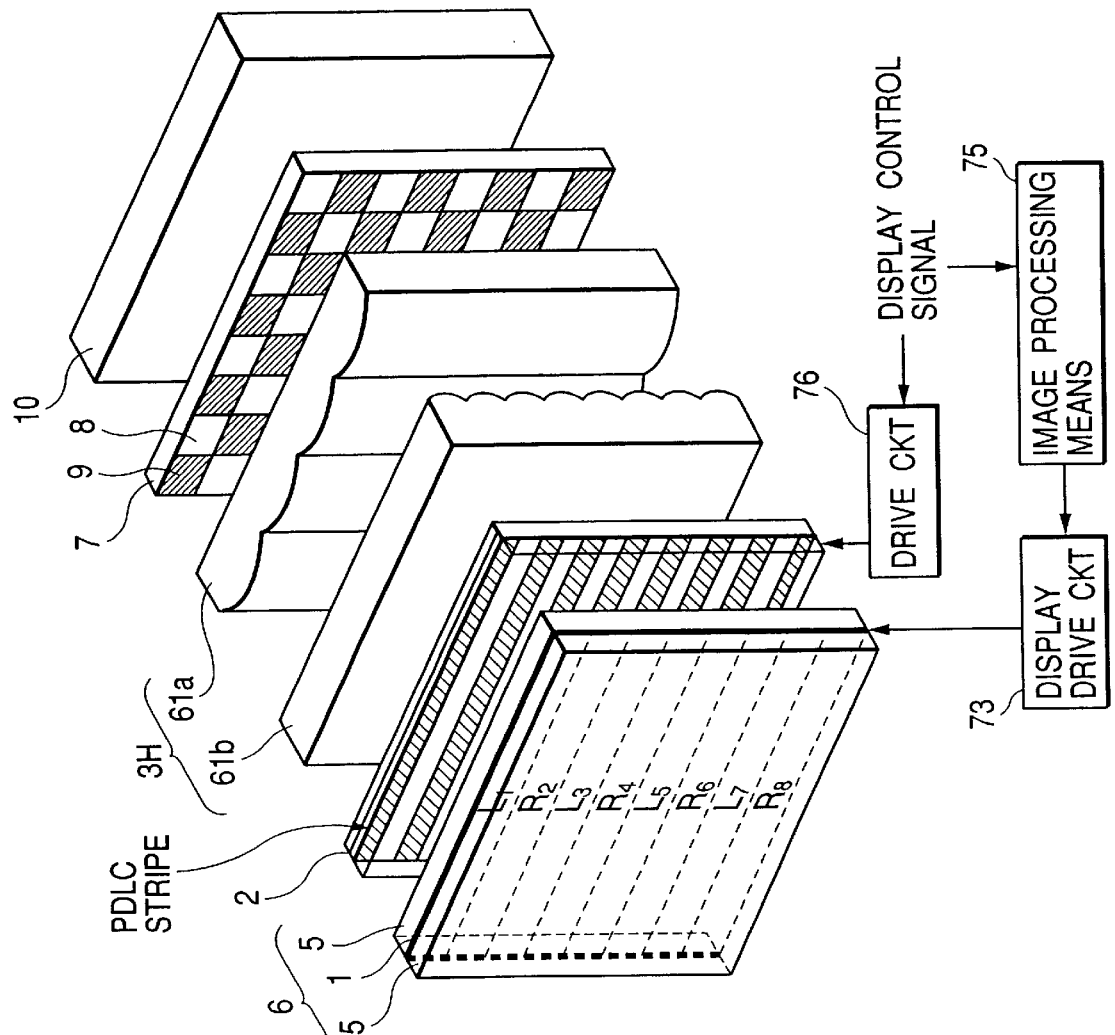
FIG. 9
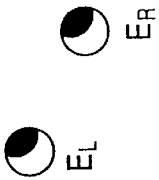

STEREOSCOPIC IMAGE DISPLAYING METHOD AND STEREOSCOPIC IMAGE APPARATUS

BACKGROUND OF THE INVENTION

1. Field of the Invention

The present invention relates to a stereoscopic image displaying method and a stereoscopic image displaying apparatus and, more particularly, to those capable of displaying an ordinary two-dimensional image and a stereoscopic image on a switched basis or capable of displaying a two-dimensional image and a stereoscopic image on a mixed basis, which are suitably applicable to observation of a stereoscopic image on TV, video, computer monitors, game machines, and so on.

2. Related Background Art

There is a conventional, stereoscopic image displaying method for preparing different polarization states for parallax images for the right eye and for the left eye and separating the left and right parallax images from each other by use of polarizing glasses. In the method under practical use, a liquid crystal shutter is provided on the display device side in order to prepare the different polarization states, the polarization states are switched one after the other in synchronism with field signals of display images on the display device, and an observer wearing the polarizing glasses can observe a stereoscopic image by separately viewing the left and right images in time division by the respective eyes. This method, however, had a drawback in that the observer always had to wear the polarizing glasses, which was troublesome.

Aside from the above method, the so-called parallax barrier method is known as one of stereoscopic image displaying method that does not require special glasses as the polarizing glasses. The parallax barrier method is a method for placing a barrier, for example, before or after the display device to spatially separate the images entering the left and right eyes from each other.

FIG. 12 is a perspective view of a major part of a stereoscopic image displaying apparatus suggested in Japanese Laid-open Patent Application No. 9-304739.

In the same figure, the apparatus has a surface illuminant, a transmissive display device, and a barrier (mask) having a plurality of apertures. The display device is adapted to display a stripe image, the stripe image being one image obtained by dividing each of the parallax image for the right eye and the parallax image for the left eye into stripes to obtain right stripe pixels and left stripe pixels and alternately arranging the right stripe pixels and left stripe pixels, thus obtained, in a predetermined order. The spatial relation between the apertures of the mask pattern and the stripe pixels is adapted to separate light beams emerging from the surface illuminant and then passing through the apertures and through the left or right stripe pixels, into different regions, thus permitting the observer to visually observe the stereoscopic image.

In the drawing, reference numeral 6 designates a transmissive liquid crystal display (display device) for displaying the image, which is constructed in such structure that a display surface (display pixel portion) 1 of a liquid crystal layer is interposed between two glass substrates 5. It is noted that the elements including a polarizing plate, a color filter, electrodes, a black matrix, and an antireflection film are omitted from the illustration.

Numeral 10 denotes a back light (surface illuminant) as an illumination light source. Numeral 7 represents a mask substrate (mask), which is made of glass or plastic and which is disposed opposite to a light-emitting surface of the back light 10. A mask pattern 9 having checkered apertures (apertures A) 8 for transmitting light, is formed in the surface of the mask 7. The mask pattern 9 is made of a metal deposit film of chromium or the like, or a light absorbing material, and is made on the mask substrate 7 by patterning. The mask substrate 7 functions as a mask having the checkered apertures 8 formed therein.

Numeral 4 indicates a lenticular lens (cylindrical lens array), which is made of a transparent plastic or glass in an array structure in which many cylindrical lenses, each being comprised of a flat surface and a convex cylindrical surface and extending in the vertical direction, are arrayed in the horizontal direction. This lenticular lens 4 is disposed between the mask substrate 7 and the liquid crystal display 6. The lens curvature of the lenticular lens 4 is set so that the mask pattern 9 is located approximately at the focus position of the cylindrical lenses composing the lenticular lens 4. A horizontal string of apertures 8 of the mask pattern 9 corresponds to each cylindrical lens forming the lenticular lens 4.

Numeral 2 represents a light directivity control element, which is made of polymer distributed liquid crystal (PDLC) and which can control either transmitting the incident light as it is or scattering it by an electric field applied thereto. Namely, the element 2 controls the directivity of the incident light. By controlling this light directivity control element 2 and the display image on the liquid crystal display 6, the stereoscopic image and the two-dimensional image are displayed on the switched basis or on the mixed basis.

FIG. 12 illustrates an example in which a stereoscopic image is displayed across the entire surface of the display surface 1. In this case, a system controller (not illustrated) or the like supplies a display control signal for displaying the stereoscopic image to apply a voltage through drive circuit 76 to the entire surface of the light directivity control element 2, so as to control the element 2 in a non-scattering state.

At the same time as it, the aforementioned display control signal is also input into image processing device 75, the image processing device 75 captures or produces the parallax image for the right eye (right parallax image) R and the parallax image for the left eye (left parallax image) L from a parallax image source not illustrated, the image processing device 75 divides each of the two parallax images into horizontal stripes to produce right stripe pixels $R_1R_2R_3R_4$ ... and left stripe pixels $L_1L_2L_3L_4$ ..., the image processing device 75 synthesizes one horizontal stripe image by alternately arranging them, for example, in the order of $R_1L_2R_3L_4R_5L_6$ ... from the top of the screen, and the device 75 outputs the image signal to a display drive circuit 73. The display drive circuit 73 receives the above signal to drive the liquid crystal display 6, so that the horizontal stripe image is displayed on the display surface 1 as shown in FIG. 12. Symbols $E_R$, $E_L$ represent the right eye and the left eye, respectively, of the observer.

For displaying the two-dimensional image on the display surface 1, the voltage is not applied to the light directivity control element 2, so as to keep the element 2 in a scattering state. The display surface 1 is illuminated by scattered light at this time, so as to permit the observer to observe the two-dimensional image.

In the stereoscopic image displaying apparatus shown in FIG. 12, the light directivity control element 2 is made of the polymer distributed liquid crystal (PDLC). For displaying the stereoscopic image on the liquid crystal display (display surface), the voltage is applied to PDLC, so as to keep PDLC in the non-scattering state, whereby the incident light is transmitted as it is. For displaying the two-dimensional image on the display surface, the voltage is not applied to keep the liquid crystal in the scattering state, whereby the incident light is scattered. This is utilized to achieve changeover between the stereoscopic image display and the two-dimensional image display.

During observation of the stereoscopic image, however, a small quantity of scattered light sometimes comes out of the polymer distributed liquid crystal (PDLC) even with application of the voltage thereto because of the property of PDLC. This sometimes increases crosstalk, so as to degrade the observation condition of the stereoscopic image.

SUMMARY OF THE INVENTION

An object of the present invention is to provide a stereoscopic image displaying method and stereoscopic image displaying apparatus using the polymer distributed liquid crystal (PDLC) for the light directivity control element and utilizing the scattering state and non-scattering state thereof to permit selective observation or simultaneous observation of the stereoscopic image and the two-dimensional image, which permits the observer to observe the both a stereoscopic image and a two-dimensional image in good condition, by properly setting the structure of the light directivity control element, so as to minimize the degradation of observation of the stereoscopic image due to the small quantity of scattered light as noise from the control element in the non-scattering state of PDLC.

A stereoscopic image displaying method of the present invention is characterized by:

(1-1) making light from a surface illuminant pass through a mask substrate in which a mask pattern comprised of a plurality of apertures is formed; making the light pass through a cylindrical lens array in which a lot of cylindrical lenses extending in one direction are arrayed in a direction perpendicular to the mentioned one direction and pass through a light directivity control element comprised of a polymer distributed liquid crystal for controlling directivity of transmitted light by stripes of control regions; thereafter on the occasion of irradiation of a transmissive display device for displaying a two-dimensional image or a stripe image which is one image achieved by dividing each of a parallax image for the right eye and a parallax image for the left eye into stripes to obtain right stripe pixels and left stripe pixels and alternately arranging the right stripe pixels and the left stripe pixels in a predetermined order, for displaying the stripe image on the display device, keeping in a non-scattering state the control regions of the light directivity control element in a display area of the stripe image to separate the respective parallax images into at least two areas to permit observation of the stereoscopic image; for displaying the two-dimensional image on the display device, keeping in a scattering state the control regions of the light directivity control element in the display area to permit observation of the two-dimensional image.

Particularly, the stereoscopic image displaying method of the present invention is characterized in that:

(1-1-1) the plurality of apertures of the mask pattern are provided corresponding to each cylindrical lens forming the cylindrical lens array for each stripe pixel, so that all light passing through the right or left stripe pixels forming the stripe image reaches a predetermined area;

(1-1-2) the stripe image is a horizontal stripe image which is one image obtained by dividing each of the parallax image for the right eye and the parallax image for the left eye into horizontal stripes to obtain the right stripe pixels and left stripe pixels and alternately arranging the right stripe pixels and left stripe pixels in a predetermined order, and the plurality of apertures of the mask pattern are provided in a checkered pattern corresponding to each cylindrical lens forming the cylindrical lens array for each stripe pixel;

(1-1-3) the stripes of control regions have a period substantially equal to a period of arrangement of the cylindrical lens array;

(1-1-4) a center line of one region in the stripes of control regions is substantially coincident with a line including a vertex of a lens surface of the cylindrical lens;

(1-1-5) a center line of one region in the stripes of control regions is substantially coincident with a border line between the cylindrical lens and cylindrical lens;

(1-1-6) the stereoscopic image and the two-dimensional image are displayed in a mixed state on the display device and light directivity of the control regions is controlled every display area; and so on.

Another stereoscopic image displaying method of the present invention is characterized by:

(1-2) making light from a surface illuminant pass through a mask substrate in which a mask pattern comprised of a plurality of apertures is formed; making the light pass through a micro optical element having different optical actions between in the horizontal direction and in the vertical direction and pass through a light directivity control element comprised of a polymer distributed liquid crystal for controlling directivity of transmitted light by stripes of control regions; thereafter on the occasion of irradiation of a transmissive display device for displaying a two-dimensional image or a stripe image which is one image achieved by dividing each of a parallax image for the right eye and a parallax image for the left eye into stripes to obtain right stripe pixels and left stripe pixels and alternately arranging the right stripe pixels and the left stripe pixels in a predetermined order, for displaying the stripe image on the display device, keeping in a non-scattering state the control regions of the light directivity control element in a display area of the stripe image to separate the respective parallax images into at least two areas to permit observation of the stereoscopic image; for displaying the two-dimensional image on the display device, keeping in a scattering state the control regions of the light directivity control element in the display area to permit observation of the two-dimensional image.

Particularly, the stereoscopic image displaying method is characterized in that:

(1-2-1) the micro optical element has first and second cylindrical lens arrays in each of which a lot of cylindrical lenses extending in one direction are arrayed in a direction perpendicular to the mentioned one direction, and the first and second cylindrical lens arrays are arranged in respective array directions along the horizontal direction and along the vertical direction;

(1-2-2) the plurality of apertures of the mask pattern are provided corresponding to each cylindrical lens forming the cylindrical lens array for each stripe pixel, so that all light passing through the right or left stripe pixels forming the stripe image reaches a predetermined area;

(1-2-3) the stripe image is a horizontal stripe image which is one image obtained by dividing each of the parallax image for the right eye and the parallax image for the left eye into horizontal stripes to obtain the right stripe pixels and left stripe pixels and alternately arranging the right stripe pixels and left stripe pixels in a predetermined order, and the plurality of apertures of the mask pattern are provided in a checkered pattern corresponding to each cylindrical lens forming the cylindrical lens array for each stripe pixel;

(1-2-4) the stripes of control regions have a period substantially equal to a period of arrangement of the cylindrical lens arrays;

(1-2-5) a center line of one region in the stripes of control regions is substantially coincident with a line including a vertex of a lens surface of the cylindrical lens;

(1-2-6) a center line of one region in the stripes of control regions is substantially coincident with a border line between the cylindrical lens and cylindrical lens;

(1-2-7) the stereoscopic image and the two-dimensional image are displayed in a mixed state on the display device and light directivity of the control regions is controlled every display area; and so on.

A stereoscopic image displaying apparatus of the present invention is characterized by:

(2-1) using the stereoscopic image displaying method of the composition (1-1) or (1-2).

BRIEF DESCRIPTION OF THE DRAWINGS

FIG. 9 is a perspective view of major part of Embodiment 3 according to the present invention;

DETAILED DESCRIPTION OF THE PREFERRED EMBODIMENTS

Figure 1:
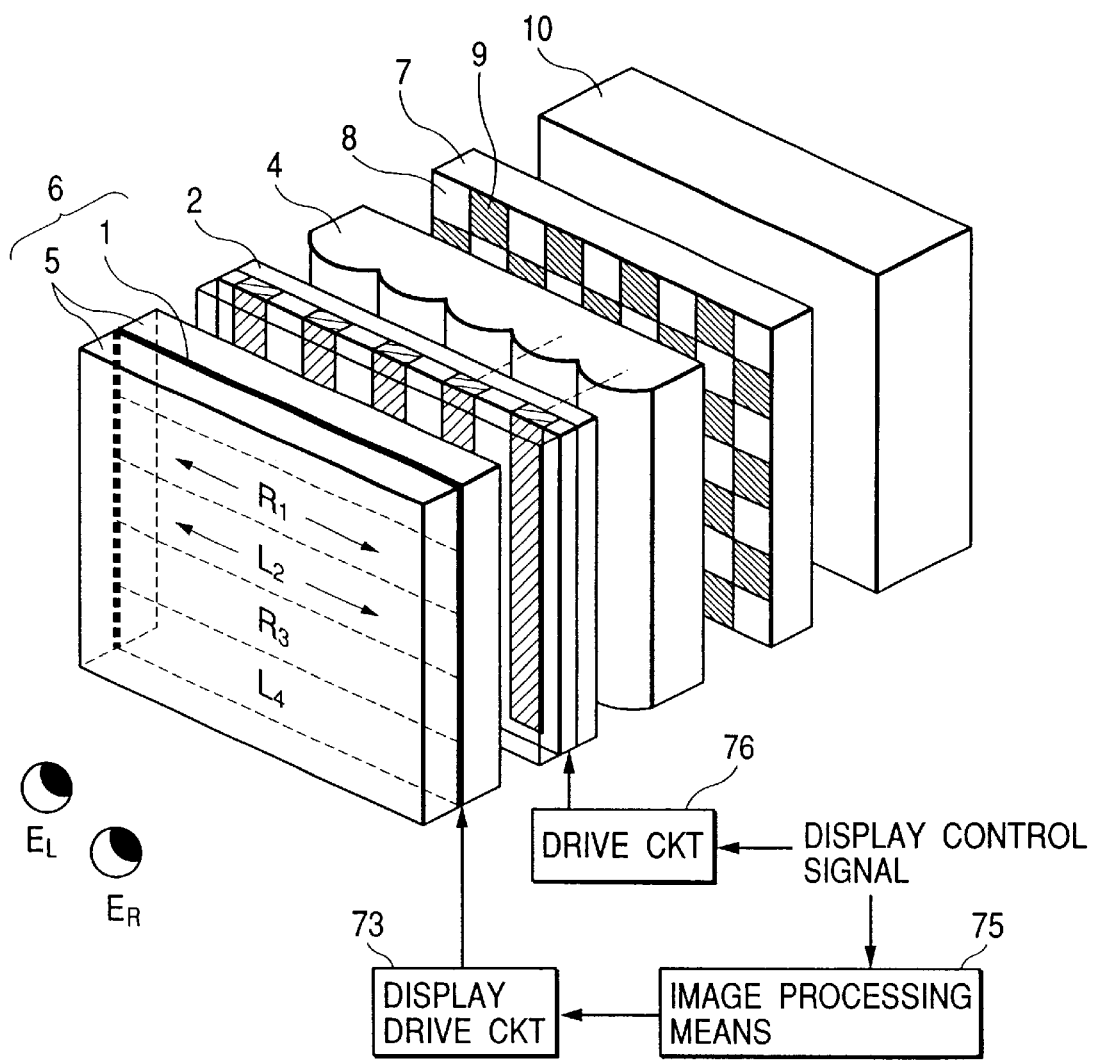
FIG. 1 is a perspective view of major part of Embodiment 1 according to the present invention.

FIG. 1 is a perspective view of a major part of Embodiment 1 of the stereoscopic image displaying apparatus according to the present invention. The present embodiment is the stereoscopic image displaying apparatus utilizing the rear barrier method in which the barrier (mask pattern) is disposed behind the liquid crystal display when observed from the observer side.

The present embodiment represents the stereoscopic image displaying apparatus which has at least a surface illuminant, a transmissive display device, and a mask substrate (mask) as a barrier with a plurality of apertures formed therein, in which the display device is adapted to display a stripe image which is one image obtained by dividing each of the parallax image for the right eye and the parallax image for the left eye into stripes to obtain right stripe pixels and left stripe pixels and alternately arranging them in a predetermined order, in which the spatial relation between the apertures of the mask and the stripe pixels is adapted to separate light beams emerging from the surface illuminant and passing through the apertures and the left or right stripe pixel into different areas, so as to permit observation of a stereoscopic image, and in which the display device displays a two-dimensional image, so as to permit observation of the two-dimensional image.

In FIG. 1, reference numeral 6 designates a transmissive liquid crystal display (display device) for displaying an image, in which a display surface (display pixel portion) 1 made of a liquid crystal layer is interposed between two glass substrates 5. In FIG. 1, the elements including the polarizing plate, color filter, electrodes, black matrix, and antireflection film are omitted from the illustration.

Numeral 10 denotes a back light (surface illuminant) as an illumination light source. Numeral 7 represents a mask substrate (mask), which is made of glass or plastic and which is disposed opposite to a light-emitting surface of the back light 10. A mask pattern 9 having checkered apertures (apertures A) 8, which transmit light, is formed in the surface of the mask 7. The mask pattern 9 is made of a metal deposit film of chromium or the like, or a light absorbing material, and is made on the mask substrate 7 by patterning. The mask substrate 7 functions as a mask having the checkered apertures 8 formed therein.

Numeral 4 indicates a lenticular lens (cylindrical lens array), which is made of a transparent plastic or glass in an array structure in which many cylindrical lenses, each being comprised of a flat surface and a convex, cylindrical surface and extending in the vertical direction, are arrayed in the horizontal direction. This lenticular lens 4 is disposed between the mask substrate 7 and the liquid crystal display 6. The lens curvature of the lenticular lens 4 is set so that the mask pattern 9 is located approximately at the focus position of the cylindrical lenses composing the lenticular lens 4. A horizontal string of apertures 8 of the mask pattern 9 corresponds to each cylindrical lens forming the lenticular lens 4, as described with the drawing below.

Numeral 2 denotes a light directivity control element, in which polymer distributed liquid crystal (PDLC) 2b is interposed in a stripe pattern between two glass substrates 2G. Transparent electrodes are provided on the inside of the glass substrates 2G. Regions 2a where the PDLC 2b of the light directivity control element 2 is not interposed, are stripes of transmissive regions 2aa for transmitting the incident light as it is.

Stripes of regions (PDLC regions) 2bb of the polymer distributed liquid crystal (PDLC) are control regions for transmitting (non-scattering) or scattering the incident light by presence or absence of the voltage applied thereto.

The light is transmitted or scattered by the control regions 2bb, based on whether a stereoscopic image or a two-dimensional image displayed on the liquid crystal display 6.

Specifically, the control regions 2bb are in a transmitting state when the stereoscopic image is displayed; whereas the control regions 2bb are in a scattering state when the two-dimensional image is displayed.

In the present embodiment a period of the stripes of control regions 2bb of the PDLC is substantially equal to an array period of the lenticular lens 4.

Figure 3A:
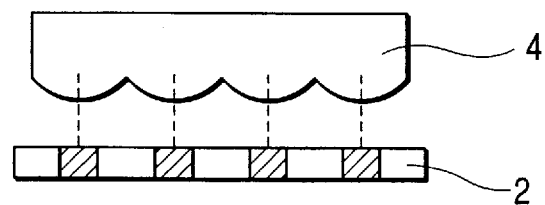
FIG. 3A and FIG. 3B are enlarged, explanatory drawings of a part of FIG. 1.
Figure 3B:
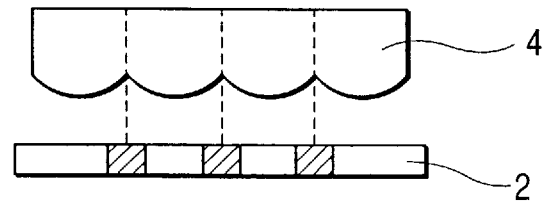

A longitudinal (vertical) center line of each stripe of control region 2b of the PDLC is substantially aligned with a vertical line including a vertex of one lens surface of the lenticular lens 4 as shown in FIG. 3A or substantially aligned with a border line (in the vertical direction) between cylindrical lenses as shown in FIG. 3B.

In the present embodiment the stereoscopic image and the two-dimensional image may be displayed in a mixed state on the display device, whereupon the control regions 2bb are formed for each display area to control the light directivity (scattering or non-scattering) independently in each area.

In the present embodiment the stereoscopic image and the two-dimensional image are displayed on a switched basis or on a mixed basis by controlling the light directivity control element 2 and the display image on the liquid crystal display 6.

FIG. 1 illustrates the example in which the stereoscopic image is displayed across the entire surface of the display surface 1. In this case, the system controller (not illustrated) of the present embodiment or the like supplies a display control signal for displaying the stereoscopic image to apply a voltage through the drive circuit 76 to the PDLC 2b of the light directivity control element 2, thereby controlling the control regions 2bb in the non-scattering state (or in the transmitting state).

At the same time as it, the aforementioned display control signal is also input into the image processing device 75, the image processing device 75 captures or produces the parallax image for the right eye (right parallax image) R and the parallax image for the left eye (left parallax image) L from a parallax image source not illustrated, the image processing device 75 divides each of the two parallax images into horizontal stripes to produce right stripe pixels $R_1R_2R_3R_4$ . . . and left stripe pixels $L_1L_2L_3L_4$ . . . , the image processing device 75 synthesizes one horizontal stripe image by alternately arranging them, for example, in the order of $R_1L_2R_3L_4R_5L_6$ . . . from the top of the screen, and the device 75 outputs the image signal to the display drive circuit 73. The display drive circuit 73 receives the above signal to drive the liquid crystal display 6, so that the horizontal stripe image is displayed on the display surface 1 as shown in FIG. 1. Symbols $E_R$, $E_L$ represent the right eye and the left eye, respectively, of the observer.

Figure 4:
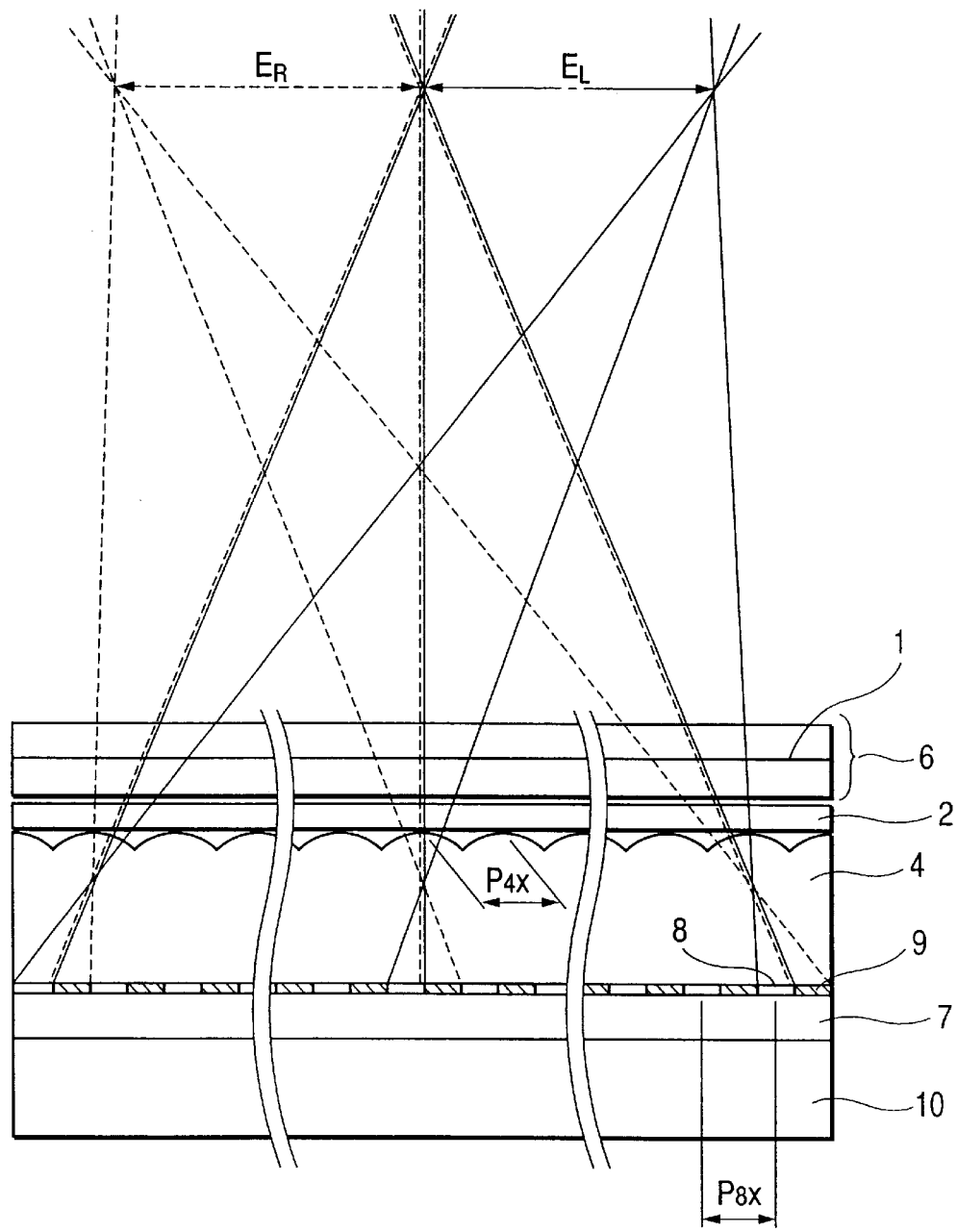
FIG. 4 is an explanatory drawing to illustrate the principle of display of stereoscopic image according to the present invention.

FIG. 4 is an explanatory drawing to illustrate the principle of stereoscopic image display in the present embodiment, which is a sectional view of the present embodiment observed from above. The action of the present embodiment will be described with this drawing. The mask substrate 7 is illuminated by the back light 10, so that light emerges from the apertures 8. The apertures 8 illustrated in the drawing correspond to the left stripe pixels $L_i$ in the horizontal stripe image displayed on the liquid crystal display 6. The light emerging from the apertures 8 passes through the lenticular lens 4 to be given directivity, then the light passes through the light directivity control element 2 and is modulated by the left stripe pixels $L_i$ of the liquid crystal display 6, and then the light emerges as indicated by the solid lines in the drawing. This permits the left stripe pixels $L_i$ displayed on the liquid crystal display 6 to be observed only in the range (area) of the arrows including the left eye $E_L$.

As for the right eye $E_R$, the apertures 8 and shield portions of the mask pattern 9, corresponding to the portions displaying the right stripe pixels $R_i$, are reverse to those in FIG. 4, and the apertures 8 correspond to the right stripe pixels $R_i$ displayed on the liquid crystal display 6. The light emerging from the apertures 8 passes through the lenticular lens 4 to be given directivity, then the light passes through the light directivity control element 2. It is then modulated by the right stripe pixels $R_i$ of the liquid crystal display 6, and the light emerges as indicated by the dashed lines in the drawing. This permits the right stripe pixels $R_i$ displayed on the liquid crystal display 6 to be observed only in the range (area) of the arrows including the right eye $E_R$.

Throughout the entire width of the screen at this time, the pitch $P_{4X}$ of the lenticular lens 4 is a little smaller than the pitch $P_{8X}$ between the horizontally adjacent apertures 8 of the mask pattern 9 so that the light from the apertures 8 uniformly converges at the left eye $E_L$ or at the right eye $E_R$.

By the action described above, the light beams passing through the left, horizontal stripe pixels $L_i$ and the light beams passing through the right, horizontal stripe pixels $R_i$ all separately reach either of the two areas in the horizontal direction; when the observer places the left and right eyes in the two areas, the observer can observe the stereoscopic image while visually recognizing the left and right parallax images L, R as sets of stripe pixels.

Since the horizontal pitch and the vertical width of the apertures 8 are properly set in the present embodiment as described above, each light beam from the left and right stripe pixels forming the stereoscopic view area converges uniformly and the wide stereoscopic view area can be ensured in the vertical direction.

Since the present embodiment is adapted to give the illumination light directivity by placing the lenticular lens 4 and mask pattern 9 behind the liquid crystal display 6 when seen from the observer, the stereoscopic image can be displayed as a sharp image without surface reflection of the lenticular lens 4 and without moire fringes of high contrast due to the black matrix of the liquid crystal display 6.

The stripe pixels forming the horizontal stripe image displayed on the liquid crystal display 6 may be synthesized alternately in the width of one scanning line or may be synthesized in the width of several scanning lines.

When the right or left stripe pixels are displayed every scanning line, it is also possible to display the right stripe pixels $R_i$ or the left stripe pixels $L_i$ every field, using the conventionally known TV interlace scanning (2:1 interlace scanning). Particularly, this method is suitable for stereoscopic display of natural image using a TV camera or the like.

Further, it is also conceivable that a self-emitting display device such as a CRT or a fluorescent display tube is used as a light source means instead of the back light 10 and mask substrate 7, the checkered aperture pattern similar to the mask pattern 9 is formed on the light-emitting surface thereof, and the light emerging from the apertures thereof is given the directivity by the lenticular lens 4.

The present embodiment employs the lenticular lens constructed of the cylindrical lenses, each being comprised of a flat surface and a convex, cylindrical surface, but a modification may be constructed using a cylindrical lens array comprised of cylindrical lenses the both surfaces of which are curved surfaces.

Figure 5A:
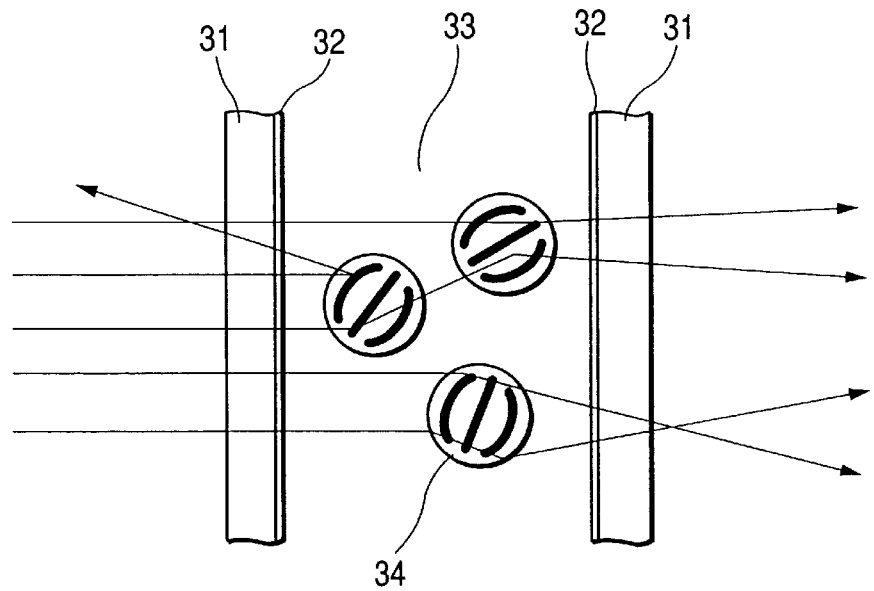
FIG. 5A and FIG. 5B are explanatory drawings to illustrate the light directivity control element according to the present invention.
Figure 5B:
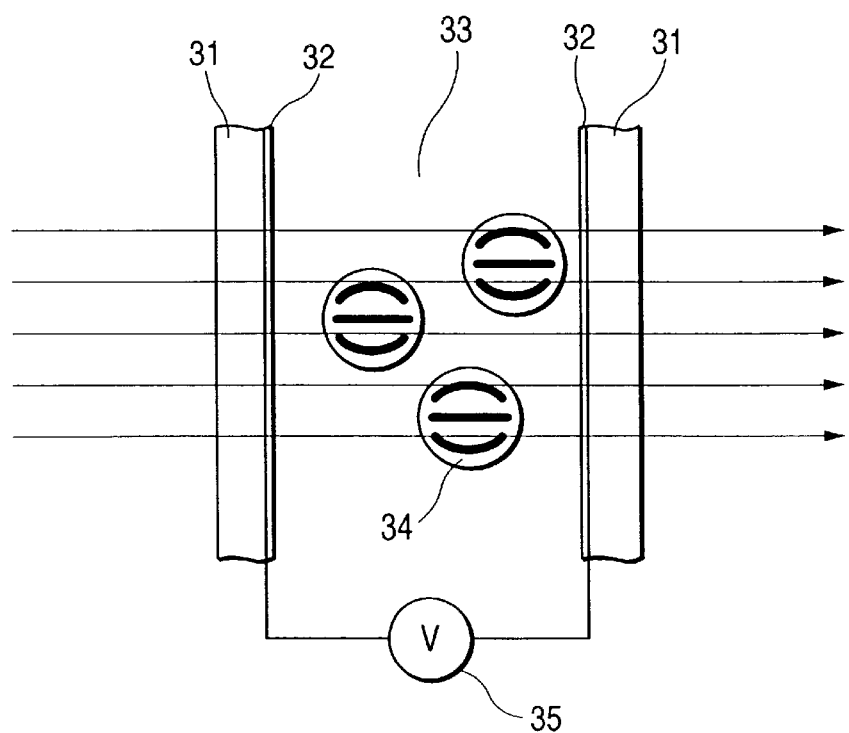

FIGS. 5A and 5B are explanatory drawings of the light directivity control element 2 made of the polymer distributed liquid crystal, employed in the present embodiment.

The light directivity control element 2 is constructed such that a transparent electrode 32 is provided on the inside of each of two transparent substrates 31 such as glass or plastic film and such that the space between them is filled with a polymer 33 in which liquid crystal molecules 34 are dispersed.

FIG. 5A shows an off state in which the voltage is not applied. At this time the optic axes of the liquid crystal molecules 34 are oriented at random and the refractive index of extraordinary light thereof is not equal to the refractive index of the polymer 33, thus achieving a state in which light is scattered at the interface between the different refractive indices.

FIG. 5B shows an on state in which the voltage is applied to the light directivity control element 2. At this time the optic axes of the liquid crystal molecules 34 are aligned in the direction of the electric field as illustrated and the refractive index of ordinary light thereof is substantially equal to the refractive index of the polymer 33, thus achieving a state in which the incident light is transmitted without being scattered.

When the stereoscopic image is displayed on the entire surface of the liquid crystal display 6 in the present embodiment, the voltage is applied to the PDLC regions 2b of the light directivity control element 2 to bring about the non-scattering state shown in FIG. 5B, whereby the illumination light is incident to each eye of the observer without disturbance in the directivity given by the lenticular lens 4 and mask pattern 9.

On the other hand, when the two-dimensional image is displayed throughout the entire surface of the display surface 1, no voltage is applied to the PDLC regions 2b of the light directivity control element 2 to bring about the light scattering state as shown in FIG. 5A, whereby the two-dimensional image to be displayed is displayed on the liquid crystal display 6.

At this time, the illumination light from the back light 10 maintains the directivity before it enters the light directivity control element 2; however, the PDLC regions 2b of the light directivity control element 2 are in the dispersed state in all directions as shown in FIG. 5A. For example, the directivity of the light beams reaching the left eye $E_L$, as indicated by the solid lines in FIG. 4, is disturbed, so that the light beams also come to enter the area of the right eye $E_R$.

Similarly, the light beams reaching the right eye $E_R$ also come to enter the left eye $E_L$, So that the whole two-dimensional image can be observed by the both eyes in the same fashion as on the ordinary two-dimensional display.

As described above, the present embodiment can achieve switching between the display of the two-dimensional image and the display of stereoscopic image without decrease in the resolution by controlling the directivity of the illumination light to the liquid crystal display 6 by the light directivity control element 2.

The light directivity control element 2 may be located at any position between the liquid crystal display 6 and the mask pattern 9.

The present embodiment may also be adapted to display the stereoscopic image in part of the display surface 1 of the liquid crystal display 6 by modifying the structure of the light directivity control element 2.

Figure 6A:
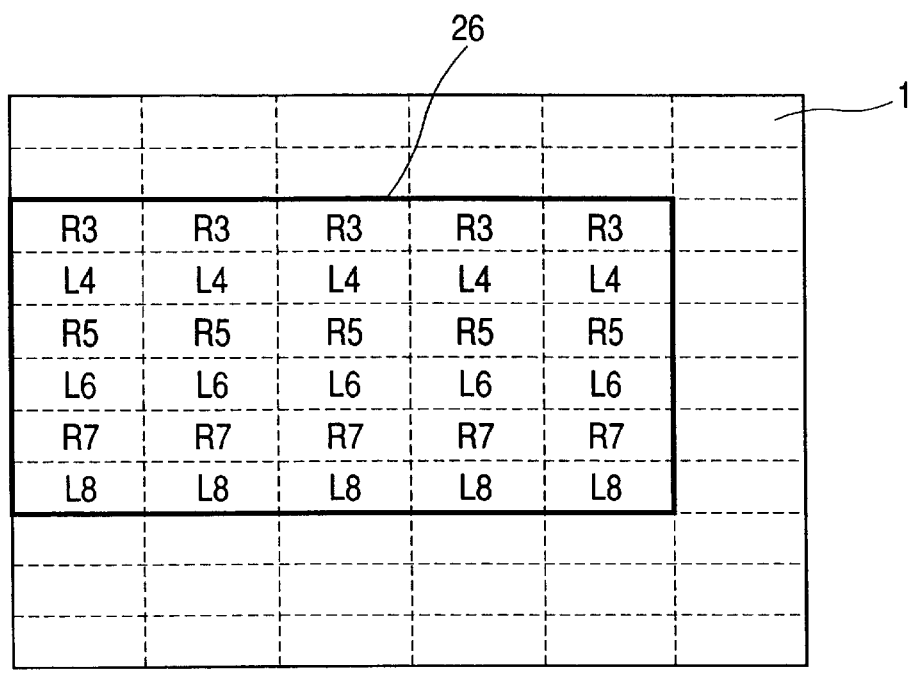
FIG. 6A and FIG. 6B are explanatory drawings to illustrate the light directivity control element according to the present invention.
Figure 6B:
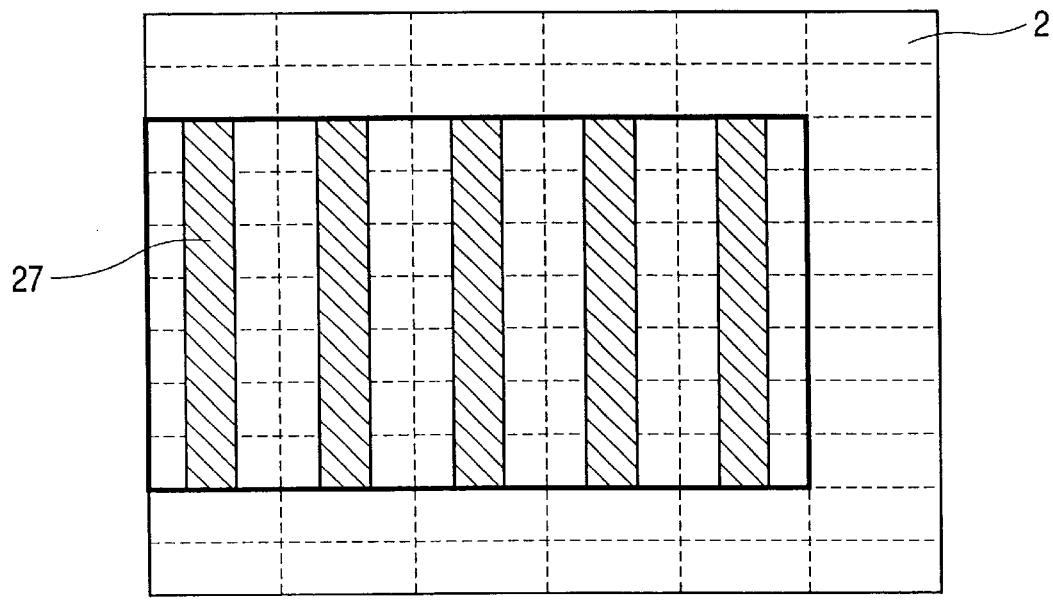

FIGS. 6A and 6B are explanatory drawings to illustrate a display state of the display image 1 displayed on the liquid crystal display 6 and a state of the light directivity control element 2 in this case, respectively.

In this case the transparent electrodes of the light directivity control element 2 are formed in a matrix pattern, and the voltage is applied partially, so as to bring about the non-scattering and light-transmitting states in predetermined regions on the light directivity control element, whereby a partial stereoscopic image is displayed in a two-dimensional image.

When the stereoscopic image is displayed in the area 26 of the liquid crystal display 6 as shown in FIG. 6A, the horizontal stripe image R3L4R5 . . . L8 is displayed in this area as described previously, and the normal two-dimensional image is displayed in the other area.

At this time the voltage is applied only to regions 27 (the hatched portions in the drawing) of the light directivity control element 2 corresponding to the area 26 of the liquid crystal display 6 as shown in FIG. 6B, whereby the non-scattering state is brought about in the regions 27 and the light-scattering state in the other portions. The stereoscopic image and two-dimensional image can be displayed and observed in part by this method.

Figure 7:
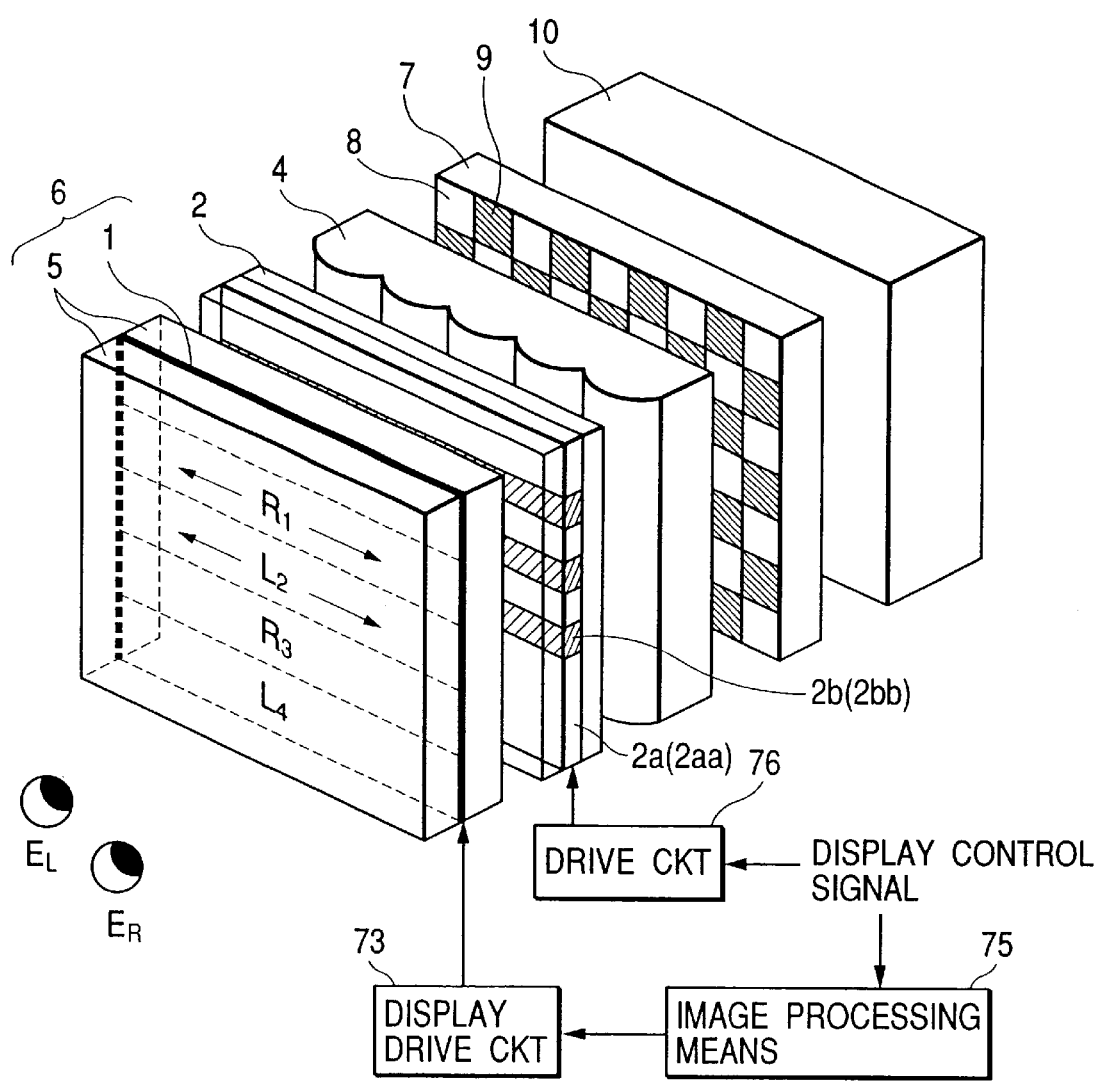
FIG. 7 is a perspective view of major part of Embodiment 2 according to the present invention.

FIG. 7 is a perspective view of major part of Embodiment 2 according to the present invention. The present embodiment is constructed substantially the same as Embodiment 1 of FIG. 1 except that the regions 2b for the PDLC of the light directivity control element 2 are not vertical but horizontal and the stripes of control regions 2bb are thus horizontal. In the figure, 2aa represents stripes of transmissive regions.

Figure 8A:
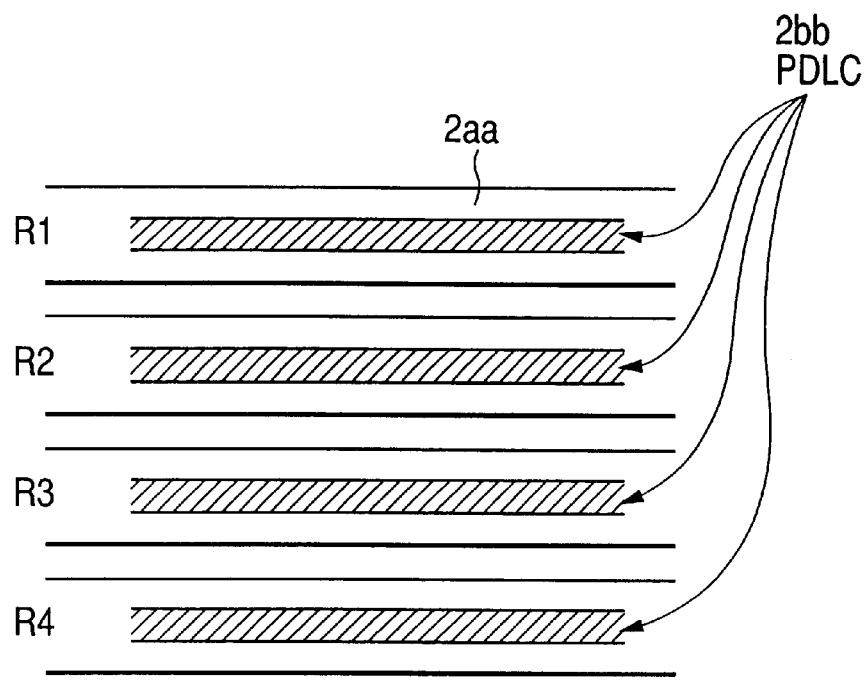
FIG. 8A and FIG. 8B are enlarged, explanatory drawings of a part of FIG. 7.
Figure 8B:
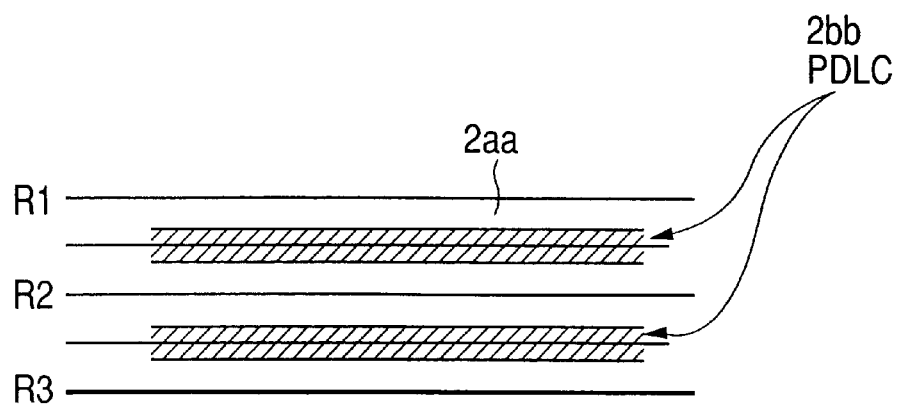

A horizontal center line of each stripe of control region 2bb is substantially aligned with a horizontal center line of each horizontal stripe image R1, L2 of the right and left parallax images as shown in FIG. 8A or with a border line (seam) between the horizontal stripe images R1, L2 as shown in FIG. 8B.

As in Embodiment 1 of FIG. 1, the PDLC of the control regions 2bb is in the transmitting state when the stereoscopic image is displayed on the liquid crystal display 6, while the PDLC of the control regions 2bb is in the scattering state when the two-dimensional image is displayed.

FIG. 9 is a schematic diagram of major part of Embodiment 3 according to the present invention. The present embodiment is different from Embodiment 2 of FIG. 7 in that the lenticular lens 4 is replaced by a micro optical element 3H comprised of a first lenticular lens 61a and a second lenticular lens 61b. Each stripe of control region 2bb of the light directivity control element 2 is arranged with respect to the horizontal lenticular lens array 61b so that a center line of each stripe is substantially aligned with a straight line including a vertex of a lens surface of each cylindrical lens or with a border line between two cylindrical lenses, for example, as shown in FIG. 3A or 3B.

Figure 2:
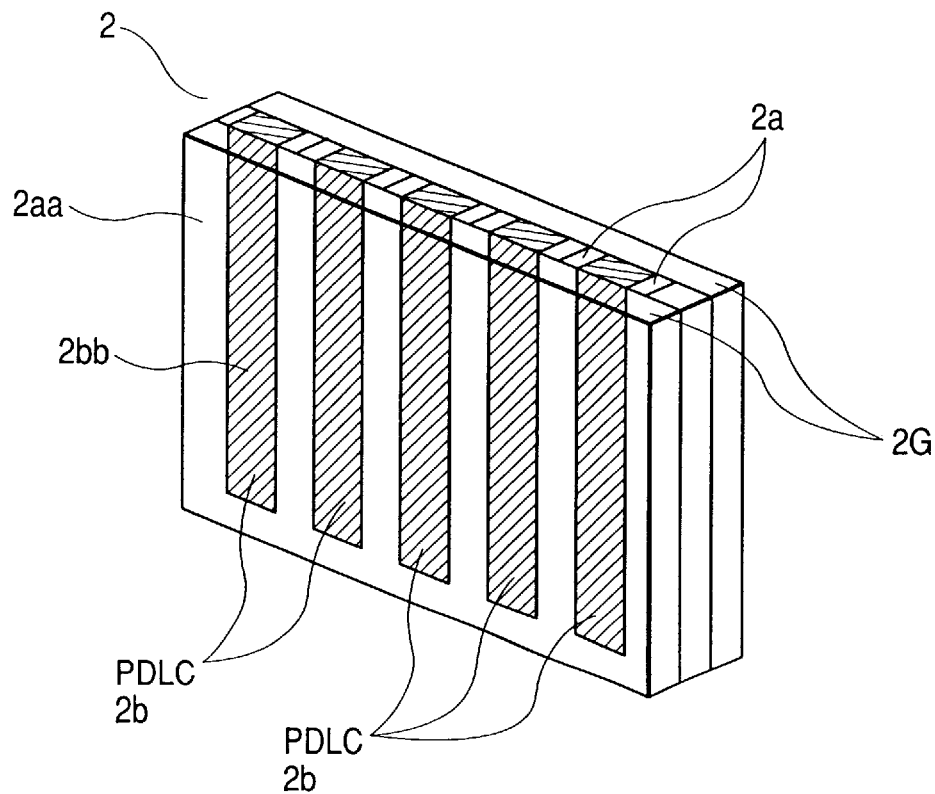
FIG. 2 is an enlarged, explanatory drawing of a part of FIG. 1.

In the present embodiment the stripes of control regions 2bb of the light directivity control element 2 may be set along the vertical direction as shown in FIG. 2.

In the present embodiment, the PDLC of the control regions 2bb is in the transmitting state when the stereoscopic image is displayed on the liquid crystal display 6, while the PDLC of the control regions 2bb is in the scattering state when the two-dimensional image is displayed, as in Embodiment 1 of FIG. 1.

The structure of the present embodiment will be described below. In the drawing the elements with the same symbols as in Embodiment 1 are the same elements as those in Embodiment 1.

In the drawing, numeral 7 represents a mask substrate (mask), which is made of glass or plastic and which is disposed opposite to the light-emitting surface of the back light 10. On the surface of the mask substrate there is a mask pattern 9 formed with checkered aperture portions 8 for transmitting light. The mask pattern 9 is made of a metal deposit film of chromium or the like, or a light absorbing material on the mask substrate 7 by patterning . The mask substrate 7 functions as a mask with the checkered aperture portions 8 formed therein.

The first lenticular lens 61a and second lenticular lens 61b are disposed between the mask substrate 7 and the liquid crystal display 6. Each of the first lenticular lens 61a and second lenticular lens 61b constitutes an element of the micro optical element 3H.

This micro optical element 3H is placed between the mask substrate 7 and the liquid crystal display 6. The lens curvature of the first lenticular lens 61a is set so that the mask pattern 9 is located nearly at the focus position of the cylindrical lenses forming the first lenticular lens 61a. A horizontal line of aperture portions 8 of the mask pattern 9 corresponds to each cylindrical lens forming the first lenticular lens 61a as described below with FIG. 10.

Numeral 2 designates the light directivity control element, which is comprised of polymer distributed liquid crystal (PDLC) cells and which is constructed in the same structure as that shown in FIG. 8A or 8B. The electric field applied to the element 2 is used to perform control of whether the stripes of regions (PDLC regions) are allowed to transmit the incident light in the direction of incidence or to scatter the incident light to various directions. Namely, the element 2 controls the directivity of the incident light (i.e., the direction of the transmitted light).

In the case of the present embodiment, the light directivity control element 2 controls the directivity of the transmitted light in the entire region or in the partial region as shown in FIGS. 6A and 6B. The present embodiment is constructed so that the stripe image (stereoscopic image) is displayed when the light directivity control element 2 is in the state in which the incident light is transmitted as it is and so that the two-dimensional image is displayed when the light directivity control element 2 is in the state in which the incident light is scattered, as in Embodiment 1. Symbols $E_R$, $E_L$ represent the right eye and the left eye, respectively, of the observer.

FIG. 9 illustrates the example in which the stereoscopic image is displayed across the entire surface of the display surface 1. In this case, as in Embodiment 1, the system controller (not illustrated) or the like supplies the display control signal for display of the stereoscopic image to apply the voltage to the entire surface of the light directivity control element 2 through the driving circuit 76, whereby the light directivity control element 2 is controlled to the non-scattering state.

At the same time, the aforementioned display control signal is also input into the image processing device 75, the image processing device 75 captures or produces the parallax image for the right eye (right parallax image) R and the parallax image for the left eye (left parallax image) L from the parallax image source not illustrated, the image processing device 75 divides each of the two parallax images into horizontal stripes to produce right stripe pixels $R_1 R_2 R_3 R_4$ . . . and left stripe pixels $L_1 L_2 L_3 L_4$ . . . , the image processing device 75 synthesizes one horizontal stripe image by alternately arranging them, for example, in the order of $L_1 R_2 L_3 R_4 L_5 R_6$ . . . from the top of the screen, and the device 75 outputs the image signal to the display drive circuit 73. The display drive circuit 73 receives the above signal to drive the liquid crystal display 6, so that the horizontal stripe image is displayed on the image display surface 1 as shown in FIG. 9.

Figure 10:
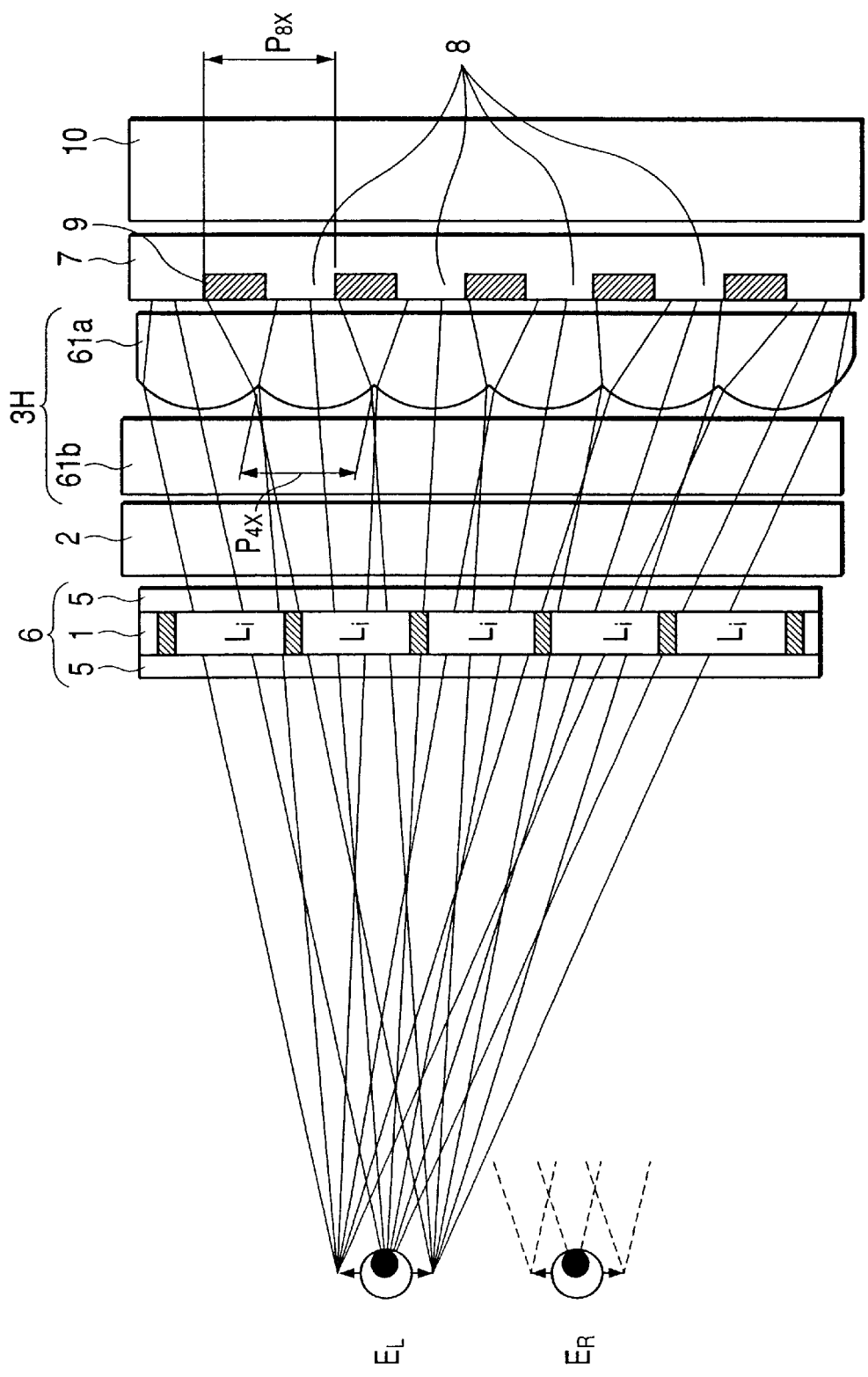
FIG. 10 is a plan view of major part of Embodiment 3 according to the present invention.

FIG. 10 is a horizontal, sectional view of the present Embodiment 3, and is an explanatory drawing to illustrate the principle of the stereoscopic image display. The constitution and action on the occasion of the stereoscopic image display in the present embodiment will be described referring to this figure. The mask substrate 7 is illuminated by the back light 10 and the light emerges from the aperture portions 8. The aperture portions 8 illustrated correspond to the left stripe pixels $L_i$ in the horizontal stripe image displayed on the liquid crystal display 6, and the light emerging from the aperture portions 8 is given the directivity through the first lenticular lens 61a to illuminate the liquid crystal display 6. Since at that time the light directivity control element 2 is in the non-scattering state, the light directivity control element 2 transmits the illumination light beam without disturbing the directivity given to the illumination light beam, as it is, and the illumination light beam is modulated by the left stripe pixels $L_i$ of the liquid crystal display 6 to emerge as indicated by the solid lines in the drawing. This causes the observer to observe the left stripe pixels $L_i$ displayed on the liquid crystal display 6 only in the range (area) of the arrows including the left eye $E_L$.

As for the right eye $E_R$, the relation is reverse to FIG. 10 between the aperture portions 8 and the shield portions of the mask pattern 9 corresponding to the portions displaying the right stripe pixels $R_i$, and thus the aperture portions 8 correspond to the right stripe pixels $R_i$ displayed on the liquid crystal display 6. The light emerging from the aperture portions 8 is given the directivity through the first lenticular lens 61a and is transmitted by the light directivity control element 2 to be modulated by the right stripe pixels $R_i$ of the liquid crystal display 6. The light emerges as indicated by the dashed lines in the drawing. This causes the observer to observe the right stripe pixels $R_i$ displayed on the liquid crystal display 6 only in the range (area) of the arrows including the right eye $E_R$.

In order to make the light from the aperture portions 8 uniformly converge at the left eye $E_L$ or at the right eye $E_R$ throughout the entire width of the screen at this time, the pitch $P_{4X}$ of the first lenticular lens 61a is a little smaller than the pitch $P_{8X}$ between the horizontally adjacent apertures 8 of the mask pattern 9.

The above action causes the all light passing through the left and right, horizontal stripe pixels $L_i$, $R_i$ to separately reach the two areas in the horizontal direction, so that the observer can observe the stereoscopic image with visually recognizing the left and right parallax images L, R as sets of stripe pixels, by placing the left and right eyes in the two areas.

Since in the present embodiment the horizontal pitch and the vertical width of the aperture portions 8 are properly set as described above, each light beam uniformly converges from the left and right stripe pixels forming the stereoscopic view area and the wide stereoscopic view area can be assured in the vertical direction.

Since the present embodiment is arranged so that the illumination light is given the directivity by placing the lenticular lenses and mask pattern 9 behind the liquid crystal display 6 when seen from the observer, the stereoscopic image can be displayed as a sharp image without the surface reflection of the lenticular lenses and without the Moire fringes of high contrast due to the black matrix of the liquid crystal display 6.

Figure 11:
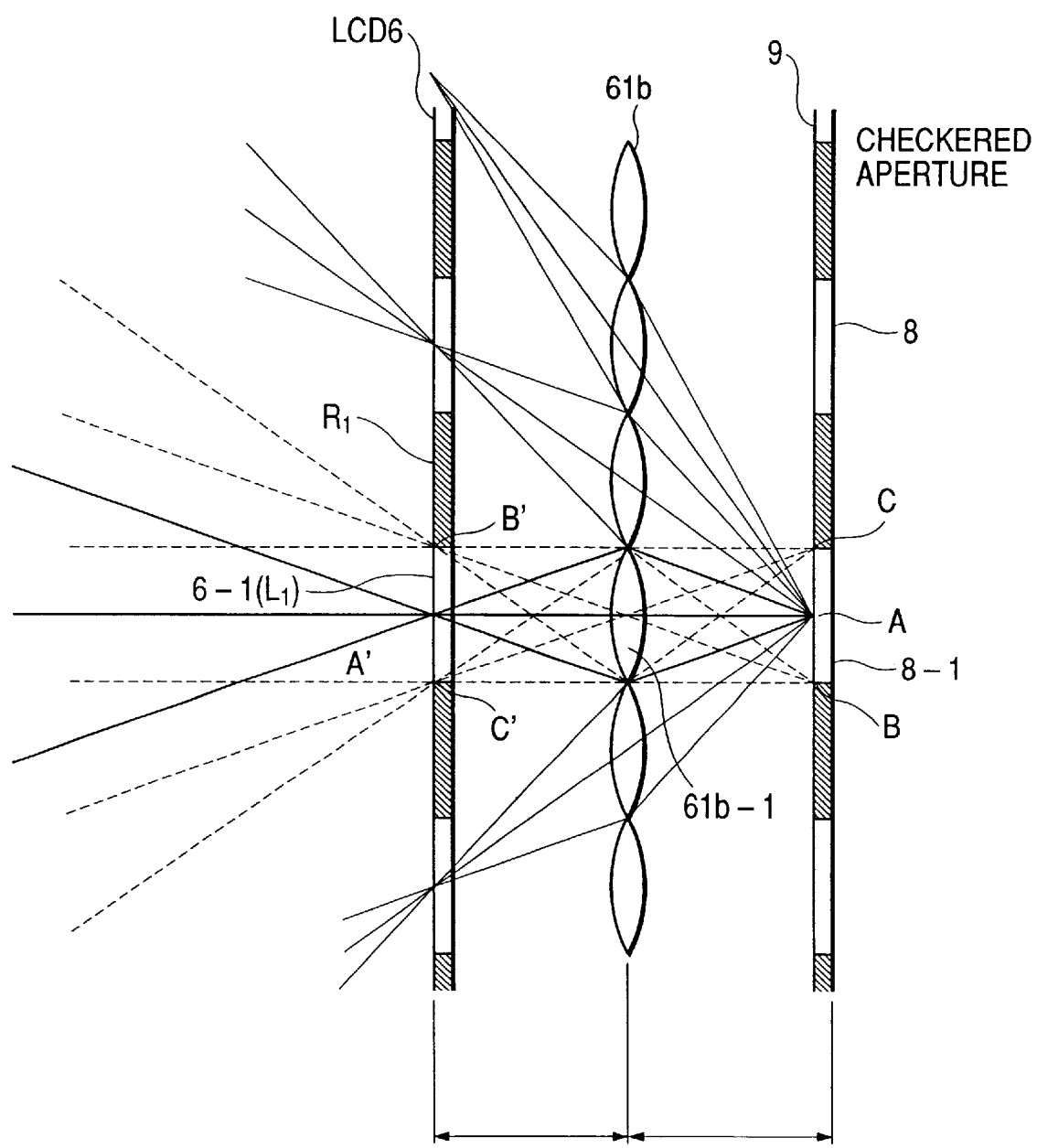
FIG. 11 is a sectional view of major part of Embodiment 3 according to the present invention.
Figure 12:
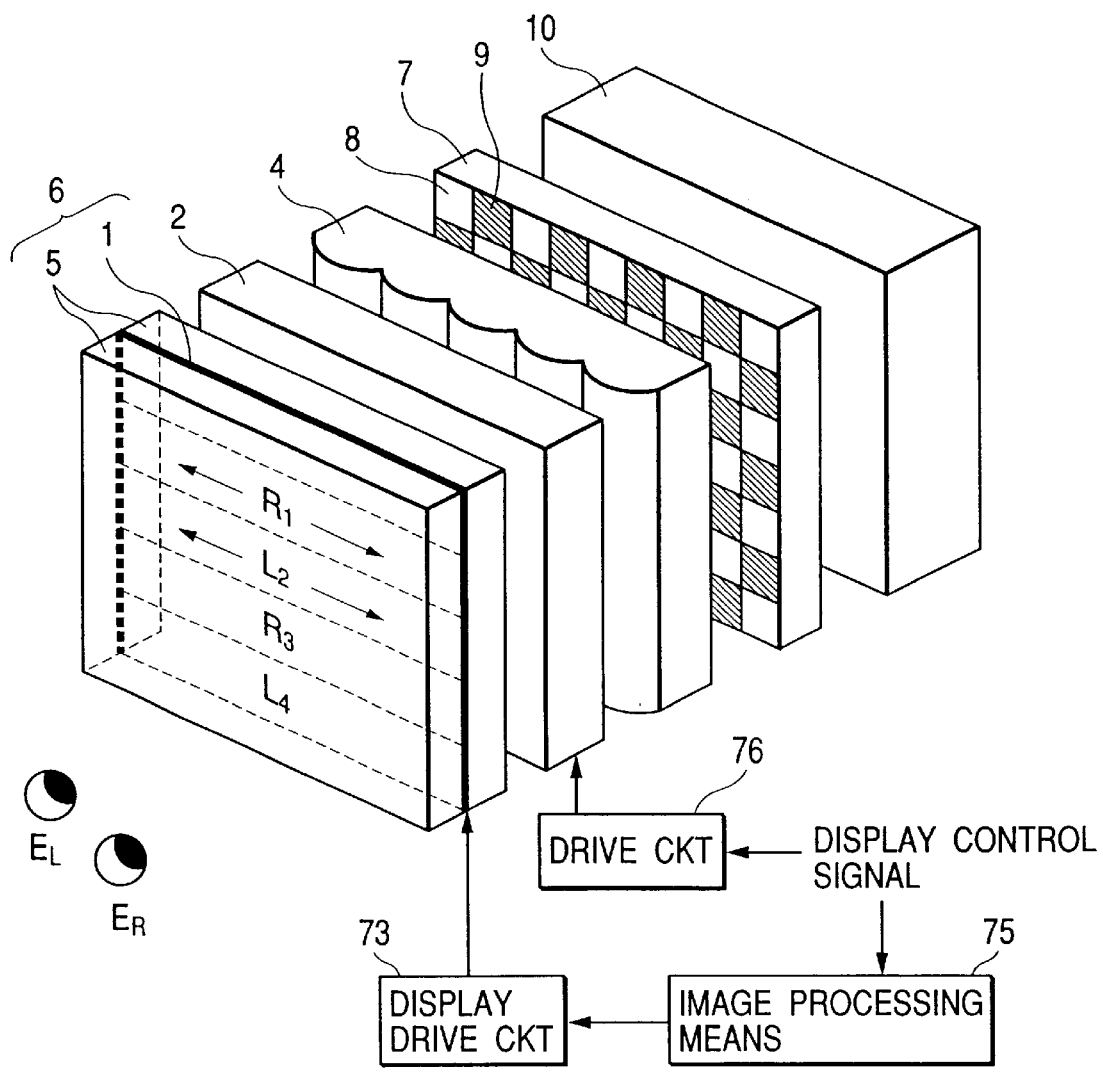
FIG. 12 is a perspective view of a major part of the conventional, stereoscopic image displaying apparatus.

FIG. 11 is a schematic, explanatory drawing of a cross section in the vertical direction of Embodiment 3. The observation area in the vertical direction will be described referring to this figure where the stereoscopic image is observed in the present embodiment. In FIG. 11 this cross section omits the illustration of the first lenticular lens 61a, the light directivity control element 2, and the glass substrate having no direct relation with the optical action, and the second lenticular lens 61b is also illustrated in a conceptual form.

The aperture portions 8 of the mask pattern 9 are arranged in the checkered pattern as shown in FIG. 9 and respectively correspond to the left and right stripe pixels alternately arranged in the vertical direction, displayed on the LCD 6. In FIG. 11, each aperture portion 8 of the mask pattern 9 is provided for illuminating the left or right stripe pixels. Let us suppose here that the aperture portions illuminate the left stripe pixels $L_i$, for example. The black portions in the mask pattern 9 are the shield portions that do not transmit light. On the LCD 6 the left stripe pixels $L_i$ corresponding to the left eye are indicated by white, while the right stripe pixels $R_i$ corresponding to the right eye by black.

The aperture portions 8 of the mask pattern 9 condense light beams in a linear shape normal to the plane of FIG. 11 on the respectively corresponding stripe pixels. Let us focus attention on one aperture of the checkered aperture pattern. In FIG. 11, light beams emerging from the center point A of the center aperture 8-1 and entering the corresponding cylindrical lens 61b-1 of the second lenticular lens 61b are linearly converged on the center point A' of the corresponding pixel line 6-1 of the LCD 6. Light beams emerging from the center point A of the center aperture 8-1 and entering the other cylindrical lenses than the cylindrical lens 61b-1 are also linearly converged at the centers of the other stripe pixels $L_i$ for the left eye of the LCD 6.

Light beams emerging from the point B or C at the edge of the aperture 8-1 and entering the cylindrical lens 61b-1 are linearly converged on the point B' or C' at the edge of the stripe pixel 6-1. Similarly, light beams emerging from the other points of the aperture 8-1 and entering the cylindrical lens 61b-1 are linearly converged on the stripe pixel 6-1 of the LCD 6. The light beams emerging from the aperture 8-1 and entering the other cylindrical lenses than the cylindrical lens 61b-1 all are also converged on the other left-eye stripe pixels of the LCD 6.

In FIG. 11, all light beams emerging from the other apertures 8 than the aperture 8-1 are also converged on the left-eye stripe pixels of the LCD 6 to illuminate them and to be transmitted. They diverge only in the vertical direction according to NA upon convergence. This action provides the observation area in which the left and right stripe pixels can be observed as uniformly being separated throughout the entire vertical width of the screen from the predetermined eye height of the observer.

Although the description herein was given for the stripe pixels $L_i$ for the left eye of the observer, the action is also the same for the stripe pixels $R_i$ for the right eye.

As described above, light beams emerging from one point on the aperture portion of mask pattern 9 are converted into a converging light beam substantially converged in the vertical section on the LCD 6 by the micro optical element 3H.

The object can be accomplished if this convergent light beam is emerged from the aperture portion 8-1 in the vertical section and if the light passing through the cylindrical lens 61b-1 is converged in the range that is within the stripe pixel 6-1 on the LCD 6.

As described above, the present invention can achieve the stereoscopic image displaying method and stereoscopic image displaying apparatus that permit the observer to observe the both images, the stereoscopic image and two-dimensional image, in good order while minimizing the degradation of observation of stereoscopic image due to the small quantity of scattered light as noise light in the non-scattering state of PDLC, by using the polymer distributed liquid crystal (PDLC) as the light directivity control element, properly setting the structure of the light directivity control element, and selectively or simultaneously permitting observation of the stereoscopic image and the two-dimensional image by utilizing the scattering state and the non-scattering state of the PDLC.

What is claimed is:

1. A stereoscopic image displaying method using a stereoscopic image displaying apparatus having a transmissive display device for displaying a stripe image, the stripe image being obtained by dividing each of a parallax image for the right eye and a parallax image for the left eye into horizontal stripes to obtain right stripe pixels and left stripe pixels, the right and left stripe pixels being arranged alternately in a predetermined order;

an array of optical elements having different optical functions in the horizontal and vertical directions;

light source means for emitting light from plural checkered patterned apertures which are arranged so as to correspond to each of the optical elements for each stripe pixel and which are adapted to cause the light from the apertures of the light source means in a horizontal cross section to form a substantially parallel light beam passing through the right or left stripe pixel to reach a predetermined area; and light directivity control means having control regions which comprise stripes of polymer distributed liquid crystal for giving directivity to the light emerging from said apertures;

said stereoscopic image displaying method comprising the steps of:
  when the stripe image is displayed on the display device, keeping in a non-scattering state the control region stripes of the light directivity control means in a display area of the stripe image to separate the parallax images into at least two areas to permit observation of a stereoscopic image; and
  when a two-dimensional image is displayed on the display device, keeping in a scattering state the control region stripes of the light directivity control means in a display area of the two-dimensional image to permit observation of the two-dimensional image.

2. A stereoscopic image displaying method according to claim 1, wherein a period of the control region stripes is substantially equal to a period of the array of optical elements.

3. A stereoscopic image displaying method according to claim 2, wherein a center line of one of the control region stripes is substantially aligned with a line including a vertex of a lens surface of one of the optical elements.

4. A stereoscopic image displaying method according to claim 2, wherein a center line of one of the control region stripes is substantially aligned with a border line between adjacent optical elements.

5. A stereoscopic image displaying method according to claim 2, wherein the stereoscopic image and the two-dimensional image are displayed in a mixed fashion on the display device and light directivity of the control region stripes is controlled in each display area.

6. A stereoscopic image displaying method according to claim 3, wherein the stereoscopic image and the two-dimensional image are displayed in a mixed fashion on the display device and light directivity of the control region stripes is controlled in each display area.

7. A stereoscopic image displaying method according to claim 4, wherein the stereoscopic image and the two-dimensional image are displayed in a mixed fashion on the display device and light directivity of the control region stripes is controlled in each display area.

8. A stereoscopic image displaying method according to claim 1, wherein the array of optical elements comprises first and second cylindrical lens arrays, the first and second cylindrical lens arrays being arranged substantially perpendicular to each other.

9. A stereoscopic image displaying apparatus using the stereoscopic image displaying method set forth in claim 1.

10. A stereoscopic image displaying apparatus using the stereoscopic image displaying method set forth in claim 2.

11. A stereoscopic image displaying apparatus using the stereoscopic image displaying method set forth in claim 3.

12. A stereoscopic image displaying apparatus using the stereoscopic image displaying method set forth in claim 4.

13. A stereoscopic image displaying apparatus using the stereoscopic image displaying method set forth in claim 5.

14. A stereoscopic image displaying apparatus using the stereoscopic image displaying method set forth in claim 6.

15. A stereoscopic image displaying apparatus comprising:

a transmissive display device for displaying a stripe image, the stripe image being obtained by dividing each of a parallax image for the right eye and a parallax image for the left eye into horizontal stripes to obtain right stripe pixels and left stripe pixels, the right and left stripe pixels being arranged alternately in a predetermined order;

an array of optical elements having different optical functions in the horizontal and vertical directions;

light source means for emitting light from plural checkered pattern apertures which are arranged so as to correspond to each of said optical elements for each stripe pixel and which are adapted to cause the light from said apertures of said light source means in a horizontal cross section to form a substantially parallel light beam passing through the right or left stripe pixel to reach a predetermined area; and light directivity control means including stripe-shaped control regions which comprise polymer distributed liquid crystal for giving directivity to the light emerging from said apertures.

16. A stereoscopic image displaying apparatus according to claim 15, wherein said array of optical elements includes first and second cylindrical lenses whose generating line directions are mutually perpendicular.

* * * * *

Disclaimer 6,246,451—Susumu Matsumura, Kawaguchi; Naosato Taniguchi, Urawa; Hideki Morishima, Kawasaki; Hiroyasu Nose, Tokyo, all of Japan. STEREOSCOPIC IMAGE DISPLAYING METHOD AND STEREOSCOPIC IMAGE APPARATUS. Patent Dated June 12, 2001. Disclaimer filed June 3, 2002, by the assignee, Mixed Reality Systems Laboratory Inc.

Hereby enters this disclaimer to all claims (1-16).

*(Official Gazette, July 16, 2002)*